Patented Sept. 14, 1948

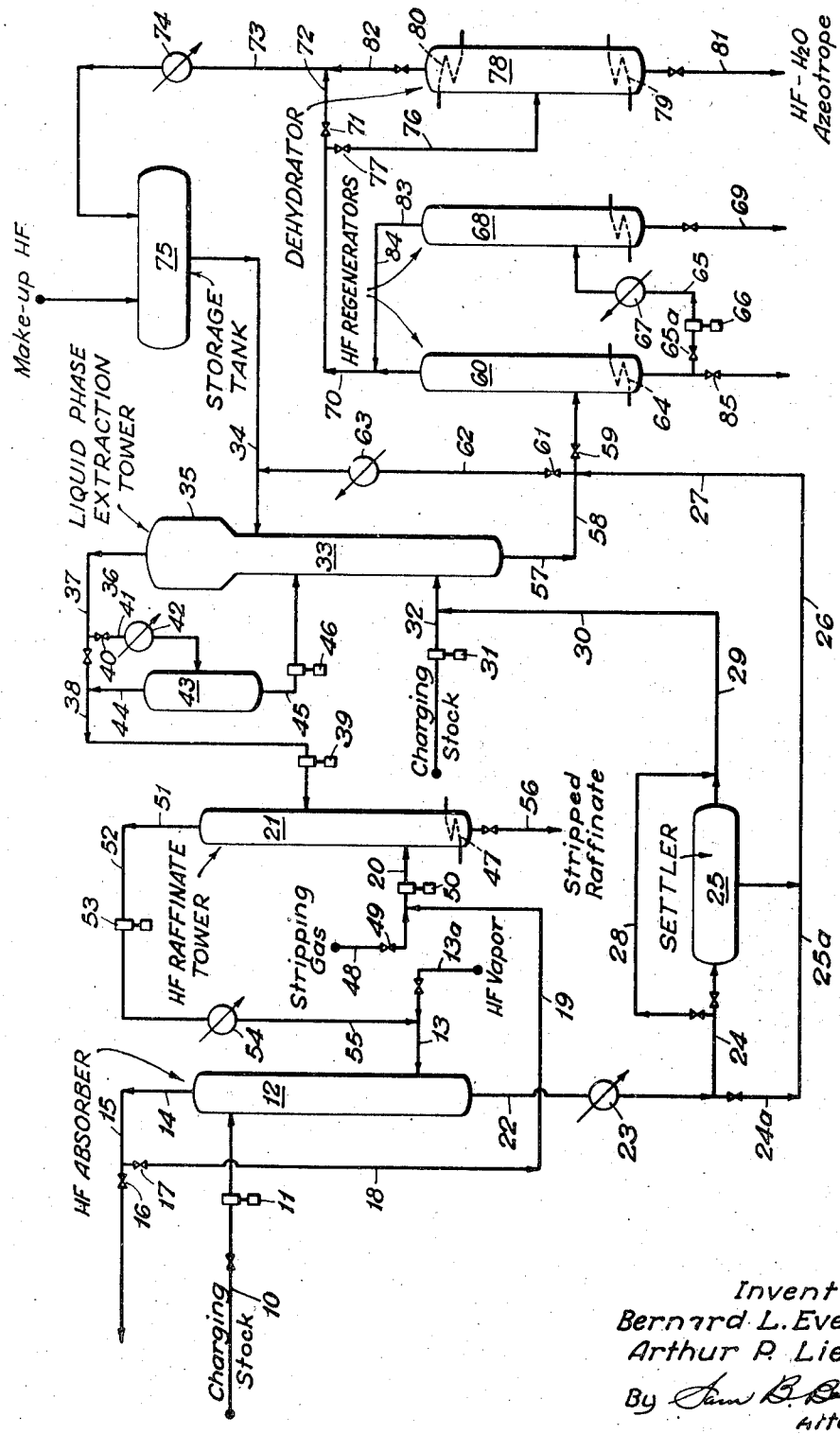

2,449,463

UNITED STATES PATENT OFFICE 2,449,463

HYDROCARBON CONVERSION PROCESS

Bernard L. Evering, Chicago, Ill., and Arthur P. Lien, Hammond, Ind., assignors to Standard Oil Company, Chicago, Ill., a corporation of Indiana Application June 29, 1945, Serial No. 602,228

8 Claims. (Cl. 196—13)

This invention relates to a hydrocarbon conversion process. More particularly it relates to a hydrocarbon conversion process wherein hydrogen fluoride is employed. Specifically, this invention relates to a method of obtaining improved hydrocarbon conversion with hydrogen fluoride and preventing the loss of hydrogen fluoride from the hydrocarbon conversion system.

By the term "hydrocarbon conversion" as used in this specification and the appended claims, we intend to designate not only chemical conversions of hydrocarbons, e. g., alkylation, cracking, isomerization, etc., but also refining operations. In hydrogen fluoride refining processes, part or all of the hydrocarbons may be chemically and physically unaffected and certain hydrocarbons such as polycyclic aromatics and impurities such as oxygen, sulfur, and nitrogen compounds are selectively separated by hydrogen fluoride.

In the treatment of hydrocarbons with hydrogen fluoride, which is ordinarily employed in the form of a liquid containing between about 90 and about 100 weight percent of hydrogen fluoride and 10 to zero percent water, the liquid or liquefied conversion products which are produced contain small proportions of dissolved or otherwise finely dispersed hydrogen fluoride. Ordinarily, the concentration of hydrogen fluoride retained in the conversion products is below 3% by weight, usually below 1%, e. g., 0.25 weight percent or even less, based on hydrocarbons.

Moreover, the presence of even a small proportion of an inorganic fluorine compound in a hydrocarbon oil destined for use in a combustion process is extremely undesirable. The combustion of hydrocarbons containing inorganic fluorine compounds produces hydrogen fluoride and water vapors, which upon condensation to the liquid phase yield an extremely corrosive solution. The retention of fluorine compounds in internal combustion engine fuels increases engine knock and reduces the effectiveness of antiknock agents which may be incorporated in the fuels. The retention of inorganic fluorine compounds in lubricants results in excessive ferrous metal corrosion.

In large scale operations, the removal from the system of conversion products containing even a small proportion of dissolved hydrogen fluoride results cumulatively in substantial hydrogen fluoride losses and, consequently, increased operating costs.

It has previously been proposed to remove hydrogen fluoride from olefins by contacting with salts such as sodium fluoride, potassium fluoride, and the like, as set forth in U. S. Patent 2,267,730. It has also been proposed to treat low boiling paraffins containing small amounts of hydrogen fluoride with high boiling olefinic materials capable of being hydrofluorinated under liquid phase hydrofluorination conditions. However, these expedients are relatively expensive and inefficient in comparison with the process of the present invention.

It is an object of this invention to recover hydrogen fluoride from hydrocarbon conversion products containing the same. Another object is to provide an improved process for the conversion of hydrocarbons with hydrogen fluoride. Still another object is to provide a process for treating hydrocarbons sequentially with hydrogen fluoride vapors and with liquid hydrogen fluoride whereby more efficient hydrocarbon conversion is effected and hydrogen fluoride losses from the hydrocarbon conversion system are minimized or entirely obviated. A further object is to provide an improved process for refining hydrocarbons containing one or more of the following substances: polycyclic aromatic hydrocarbons and compounds of oxygen, nitrogen, or sulfur, which process involves the employment of hydrogen fluoride. An additional object is to provide a process for desulfurizing hydrocarbons containing sulfur compounds by extraction with liquid hydrogen fluoride, which process is characterized by the avoidance of hydrogen fluoride losses from the system as inclusions in the desulfurized raffinate phase and which process is also characterized by economies in the proportion of liquid hydrogen fluoride required in the extraction process. Other objects will become apparent as the description of our invention proceeds.

Briefly, we have found that hydrogen fluoride can be recovered from solution in hydrocarbon conversion products by separating it as a vapor from the conversion products and thereafter absorbing the vapor in hydrocarbon charging stock being passed to the conversion operation. The absorption conditions can be so regulated that hydrogen fluoride vapors are substantially completely absorbed. Furthermore, under some conditions more or less conversion of the hydrocarbon charging stock can be effected by the hydrogen fluoride in the absorption process, resulting in a reduction of the amount of hydrogen fluoride required in the principal hydrocarbon conversion operation per se.

Our invention is applicable to the treatment of any hydrocarbon conversion products containing dissolved, entrained, or otherwise highly dispersed hydrogen fluoride. Such products are produced, for example, by the conversion of pure hydrocarbons or petroleum oils or fractions thereof with hydrogen fluoride or materials forming hydrogen fluoride in the course of the conversion operation, e. g., fluorosulfonic acid, boron trifluoride, fluorophosphoric acids, and silicon tetrafluoride. Among such conversions may be mentioned cracking, isomerization, alkylation of paraffins with olefins, naphthenes, or aromatics, alkylation of aromatics with olefins or naphthenes, alkylation of naphthenes with olefins, olefin polymerization, processes for refining hydrocarbon oils with hydrogen fluoride, and fluorination of hydrocarbons.

We have observed that the molal requirement of gaseous anhydrous hydrogen fluoride to remove, as an insoluble complex, the more easily removable organic sulfur compounds is less than the molal requirement of liquid substantially anhydrous hydrogen fluoride for the extraction of these sulfur compounds. However, extraction with liquid hydrogen fluoride is necessary to extract difficultly removable organic sulfur compounds. The process of our invention affords the advantage not only of recovering hydrogen fluoride from gases but also of lowering the total hydrogen fluoride requirement to obtain a given degree of desulfurization where a liquid hydrogen fluoride extraction step is employed.

We have observed that desulfurization of hydrocarbons containing sulfur compounds can be effected in substantial measure by contacting said hydrocarbons in the liquid phase with hydrogen fluoride vapors, whereby the hydrogen fluoride is absorbed in the hydrocarbons and forms complexes or sludge-like materials with the sulfur compounds contained therein. The complexes or sludge can be separated from the hydrocarbons, e. g., by gravity settling or centrifuging, and substantially complete desulfurization of the hydrocarbons can thereafter be effected by extracting with liquid substantially anhydrous hydrogen fluoride. The refined hydrocarbons, containing substantially no sulfur compounds but a small proportion, e. g., between about 0.1 and about 1 weight percent, of dissolved or otherwise highly dispersed hydrogen fluoride are then subjected to treatment to remove hydrogen fluoride as a vapor. The treatment can comprise the application of heat, vacuum, or stripping gases or a combination thereof. The resulting hydrogen fluoride vapors are then absorbed selectively in a portion of the fresh hydrocarbon charging stock and the process cycle is thereafter repeated.

A preferred embodiment of our invention is schematically illustrated in the attached figure. Numerous engineering details are omitted from the figure in the interests of simplification. A hydrocarbon charging stock may be passed by valved line 10 and pump 11 into a hydrogen fluoride absorption tower 12. The hydrocarbon charging stock may be petroleum or a fraction thereof, e. g., gasoline, light naphtha, heavy naphtha, kerosene, gas oil, fuel oil, lubricating oil, Diesel fuel, etc., which contains sulfur compounds. In the hydrogen fluoride absorption tower, the liquid hydrocarbon charging stock meets a counterflow of hydrogen fluoride vapors commingled with an inert stripping gas, introduced via line 13. Concurrent absorption may be effected in tower 12, but countercurrent absorption is preferred. The absorption conditions are selected to result in the selective absorption of the hydrogen fluoride vapors from the inert stripping gas which passes overhead from tower 12 by lines 14 and 15. Part or all of the inert stripping gas can be removed from the system by opening valve 16 and partially or completely closing valve 17. It is preferred to recycle the stripping gas via valve 17 and lines 18, 19, and 20 to the raffinate stripper 21. Absorption can be effected in tower 12 at temperatures in the range of about zero to about 200° F., preferably about 70 to about 120° F. The ratio of hydrogen fluoride to hydrocarbon charging stock in tower 12 is adjusted so that each mol of hydrogen fluoride passing through the tower is contacted with at least 0.2 mol, preferably between about 0.5 and about 2 mols, of sulfur compounds and other substances in the hydrocarbon charging stock which are capable of combining with hydrogen fluoride to form complexes. The amount of hydrocarbon charge required varies with the nature and molecular weight of the hydrocarbons as well as the amount of the sulfur compounds present. Little or no inert stripping gas is absorbed in tower 12, since it is incapable of forming complexes with substances contained in the hydrocarbon charging stock.

The hydrocarbon charging stock containing absorbed hydrogen fluoride is withdrawn from tower 12 by line 22 and passes through heat exchanger 23 wherein its temperature may suitably be adjusted for the subsequent operation of liquid phase extraction with hydrogen fluoride. From heat exchanger 23 the charging stock passes into valved line 24 and settler 25 to separate sludge-like materials and complexes containing hydrogen fluoride and sulfur compounds and, in some cases, highly unsaturated materials and aromatics containing three or more rings. Sludge and complexes of hydrogen fluoride form a lower layer in settler 25 and are treated to recover hydrogen fluoride therefrom by passing them through lines 26, 27, and valved line 58 into a regenerator 60. Although settler 25 is depicted as a gravity settling drum, it will be appreciated that a centrifuge could be used in its stead. The hydrocarbon charging stock which has been practically or entirely freed of complexes and sludge in settler 25 is passed by lines 29, 30, and 32 into tower 33 wherein it is subjected to liquid phase extraction with liquid hydrogen fluoride. In some instances, part or all of the hydrocarbon charging stock may be by-passed around settler 25 by the use of valved line 28, which leads into line 29.

Ordinarily, the amount of hydrogen fluoride to be recovered in absorption tower 12 is insufficient to require the passage of the entire hydrocarbon charging stock through the tower. Therefore, part of the hydrocarbon charging stock is passed directly into the liquid phase hydrogen fluoride extraction tower 33 by pump 31 and line 32. In tower 33 the hydrocarbon charging stock is treated with liquid hydrofluoric acid containing between about 90 and 100 weight percent hydrogen fluoride, preferably 98 to 100 weight percent hydrogen fluoride, in quantity sufficient at least to form distinct liquid extract and raffinate phases. The amount of hydrogen fluoride employed should be at least 10 weight percent based on hydrocarbons, but may be 50, 100, 200 weight percent or even more. Ordinarily, 15 to 50 weight percent of hydrogen fluoride is employed.

Extraction temperatures in tower 33 can be varied between about zero and about 400° F. Ordinarily, temperatures in the range of about 60 to about 90° F. are used, e. g., 75 to 80° F. A temperature differential, e. g., as much as 25 or 50° F., may be maintained between the end zones of the extraction tower. At high temperatures, e. g., above about 250° F., lower boiling hydrocarbons and hydrogen sulfide may be produced to some extent by partial cracking of the hydrocarbon feed stock. Sufficient pressure is maintained in the extraction tower to insure liquid phase extraction conditions. Sufficient contact time is allowed in tower 33 to provide for efficient extraction of sulfur compounds; this constitutes no problem since the reaction of hydrogen fluoride with sulfur compounds is quite rapid and contact periods between about 1 and 120 minutes, e. g., 5 minutes, are ordinarily satisfactory. Increased intimacy of contacting may be effected in towers 12 and 33 by providing packing material therein which is resistant to the action of substantially anhydrous liquid hydrogen fluoride, e. g., Monel metal turnings, mild carbon steel, etc. Although only one liquid extraction tower is illustrated, it should be understood that more than one can be used.

The preferred method of effecting the liquid phase hydrogen fluoride extraction process, as illustrated, involves countercurrently contacting the liquid hydrogen fluoride entering the upper portion of tower 33 by line 34, which leads from hydrogen fluoride storage tank 75, with the hydrocarbon stock passing into the tower at a low point. It should be understood that concurrent contacting may also be employed in the extraction process, although it is somewhat less efficient and not as desirable as countercurrent contacting. As the liquid hydrogen fluoride passes downwardly through the tower against the counterflow of hydrocarbon charging stock it removes the sulfur compounds contained therein by solvent or chemical action, or both, forming a liquid extract phase in the lower portion of tower 33. If the hydrocarbon charging stock contains nitrogen or oxygen compounds or polycyclic aromatic hydrocarbons, these substances are also removed quite completely or to a considerable extent in the extraction process and are withdrawn with the extract phase.

A raffinate phase of refined hydrocarbon charging stock containing a relatively small proportion of dissolved hydrogen fluoride forms in the upper part of extraction tower 33 which comprises an enlarged topmost section 35 to facilitate settling of entrained hydrogen fluoride from the raffinate. Raffinate passes overhead from tower 33 by lines 36 and 37 and can be passed directly into the raffinate stripper 21 via valved line 38 and pump 39. Where high flow rates of hydrogen fluoride and hydrocarbon charging stock are employed in tower 33 there may be a tendency for hydrogen fluoride (in excess of dissolved hydrogen fluoride) to be carried overhead with the raffinate from tower 33. In this event, the valve in line 38 is partially or entirely closed and part or all of the raffinate is passed into settler 43 through valve 40, line 41 and heat exchanger 42. Cooling the raffinate in heat exchanger 42 prior to settling in settler 43 reduces the solubility of hydrogen fluoride therein and decreases the load on raffinate stripper 21 and absorption tower 12. Settler 43 may be provided with baffles, packing or other devices to improve the separation of dispersed or entrained hydrogen fluoride from the raffinate therein. Although a gravity settler is shown, it will be understood that we can use a centrifugal separator instead. Raffinate passes overhead from settler 43 by line 44 and then passes through line 38 and pump 39 to raffinate stripper 21. A hydrogen fluoride layer is passed by line 45 and pump 46 from settler 43 into an intermediate point in tower 33.

In raffinate stripper 21, hydrogen fluoride dissolved or otherwise highly dispersed in the raffinate is removed by the application of heat, reduction of pressure or contacting with an inert stripping gas, or a combination of two or all three of these agencies. We prefer to employ a combination of indirect heating and the introduction of a stripping gas into the raffinate to remove the hydrogen fluoride contained therein. Raffinate stripper 21 is provided with a heating coil 47 through which steam, hot oil, Dowtherm or other heating agency is passed.

An inert stripping gas can be passed into the raffinate in the lower portion of the stripper by means of line 48, valve 49, pump 50, and line 20. Stripping gas is recycled from hydrogen fluoride absorption tower 12 to stripper 21 as described above. When the stripping and absorption operations attain a steady state, it is usually necessary to add only small amounts of fresh stripping gas to the system via line 48. Suitable inert stripping gases for use in tower 21 are nitrogen, deoxidized flue gases, carbon dioxide, volatile saturated hydrocarbons such as methane, ethane, propane, etc., and the like.

The operating conditions in stripper 21 may vary over a wide range depending upon the stock being treated. For example, a gasoline fraction boiling over the range of about 215 to about 420° F. can be stripped satisfactorily at temperatures within the range of about 200 to about 450° F., preferably about 300 to about 400° F., and pressures from about 5 to about 150 pounds per square inch, preferably about 25 to about 100 pounds per square inch. Usually a temperature of at least about 100° F. is employed in the stripper.

Vaporized hydrogen fluoride and the stripping gas which is employed passes overhead from stripper 21 via lines 51 and 52, pump 53, heat exchanger 54 and line 55 into line 13 and thence to hydrogen fluoride absorption tower 12 whose mode of operation has been described above. Heat exchanger 54 adjusts the temperature of the vapors passing through line 52 to a suitable level for the absorption operation to be effected in tower 12.

To increase the extent of refining which occurs during the absorption of hydrogen fluoride vapors in the hydrocarbon charging stock in tower 12, it may be desirable to introduce additional hydrogen fluoride vapors via valved line 13a.

Stripped raffinate, which is a substantially desulfurized and otherwise refined product derived from the hydrocarbon charging stock is withdrawn from the base of stripper 21 via valved line 56 and may be subjected to such further treatment as the circumstances warrant, e. g., washing with water, caustic solutions, contacting or percolation with clays or other refining adsorbents, treatment with bauxite in the vapor phase, etc.

The extract phase formed in the lower portion of extraction tower 33 is withdrawn through line 57 and is passed into hydrogen fluoride regenerator 60 via line 58 and valve 59. A minor proportion of the extract can be recycled to the extraction operation by partially closing valve 59 and opening valve 61, whereupon extract passes through line 62, heat exchanger 63, and line 34 into extraction tower 33.

In hydrogen fluoride regenerator 60, which is provided with a heating coil 64, extract, hydrogen fluoride complexes and sludges containing hydrogen fluoride are subjected to heat, and pressure reduction if desired, to remove hydrogen fluoride as a vapor or gas. The operating conditions in tower 60 are adjusted to vaporize dissolved and loosely-bound hydrogen fluoride from hydrogen fluoride containing materials charged thereto. Suitable conditions are, for example, temperatures in the range of about 100 to 190° F. at pressures in the range of about 5 to about 50 p. s. i. g. Upon substantial completion of the removal of dissolved and loosely-bound hydrogen fluoride therefrom, liquid and sludgy materials are withdrawn from regenerator 60, via valve 65a, pump 66, line 65, and heater 67 and are injected into hydrogen fluoride regenerator 68, wherein the operating conditions are adjusted to regenerate and vaporize firmly-bound hydrogen fluoride from complexes, sludge and the like. Suitable operating conditions are temperatures in the range of about 200 to about 500° F., preferably about 200 to about 350° F., at atmospheric or somewhat higher pressure, e. g., 50 p. s. i. g.

The removal of hydrogen fluoride via lines 83 and 84 can be facilitated by maintaining a subatmospheric pressure on regenerator 68, although this condition is not essential. Under the operating conditions maintained in regenerator 68, chemically bound hydrogen fluoride or hydrogen fluoride otherwise firmly bound is regenerated from its compounds with organic materials and vaporized. Organic materials substantially free of hydrogen fluoride are withdrawn from regenerator 68 via valved line 69.

The extract materials withdrawn from regenerator 68 are highly aromatic and contain a considerable proportion of sulfur. For example, an extract produced by desulfurizing heavy naphtha with liquid hydrogen fluoride contained 14.1 weight percent sulfur and exhibited a refractive index ($n_D^{20}$) of 1.4989, density ($d_4^{20}$) of 0.913 and a specific dispersion of 126. A furnace oil extract produced by our process contained 9.0 weight percent of sulfur, and exhibited a refractive index ($n_D^{20}$) of 1.5351, density ($d_4^{20}$) of 0.985 and specific dispersion of 149.

Hydrogen fluoride vapor produced in regenerator 60 passes overhead via line 70, valve 71, lines 72 and 73, and condenser 74 into hydrogen fluoride storage tank 75. Hydrocarbon stocks charged to the extraction and absorption systems of this invention usually contain some water which is absorbed by the highly hygroscopic hydrogen fluoride. Water reduces the extraction efficiency of liquid hydrogen fluoride and ordinarily not more than about 10 weight percent of water can be economically tolerated therein. Accordingly, the hydrogen fluoride stream in line 70 is intermittently or continuously diverted into line 76 through valve 77 by partially or completely closing valve 71. The hydrogen fluoride stream containing water vapor is passed into a dehydrator 78 provided with a reboiler coil 79 and a cooling or dephlegmating coil 80. Dehydrator 78 is a fractionating tower suitably equipped with fractionating devices such as packing or bubble cap trays, wherein a maximum boiling hydrogen fluoride-water azeotrope separates as a bottoms fraction and is removed via valved line 81 and substantially anhydrous hydrogen fluoride vapors pass overhead through valved line 82, into line 73 and thence to condenser 74 and storage tank 75. The load on dehydrator 78 may be decreased or its employment may be avoided by pre-drying feed stock charged to the process.

If desired, the maximum boiling hydrogen fluoride-water azeotrope can be subjected to treatment to remove hydrogen fluoride therefrom. For example, the azeotrope can be treated with thionyl chloride to produce a mixture of hydrogen fluoride and sulfur dioxide vapors from which substantially anhydrous hydrogen fluoride can be condensed. The following reactions occur:

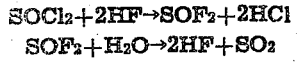

$$SOCl_2 + 2HF \rightarrow SOF_2 + 2HCl$$
$$SOF_2 + H_2O \rightarrow 2HF + SO_2$$

The hydrogen chloride gas which is formed in the first reaction is completely insoluble in hydrogen fluoride and passes off. A mixture of sulfur trioxide, chlorine and sulfur can be used instead of $SOCl_2$, since these materials react as follows to form $SOCl_2$:

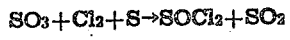

$$SO_3 + Cl_2 + S \rightarrow SOCl_2 + SO_2$$

It will be appreciated that the drawing and its description herein relate only to a preferred embodiment of the process of our invention and that our invention is not limited thereto. Numerous modifications can be made in the process described without departing from the spirit of our invention. Thus, modifying materials can be added to the hydrogen fluoride used in our process, for example, $FSO_3H$, $BF_3$, fluorophosphoric acids, $SiF_4$, and the like. Also, hydrogeneous gases may be injected into the liquid phase extraction tower 33.

Having thus described our invention, what we claim is:

1. A hydrocarbon treating process which comprises in sequence, contacting hydrocarbons under treating conditions with liquid hydrogen fluoride, separating partially spent liquid hydrogen fluoride and a hydrocarbon product containing a small proportion of dissolved hydrogen fluoride from said treating process, vaporizing dissolved hydrogen fluoride from said hydrocarbon product, absorbing the resultant hydrogen fluoride vapor in a hydrocarbon charging stock containing a substance capable of forming a complex with hydrogen fluoride and thereafter separating a hydrogen fluoride complex from the hydrocarbon charging stock and passing the hydrocarbon charging stock to the treating process.

2. A hydrocarbon treating process which comprises, in sequence, contacting hydrocarbons under treating conditions with liquid hydrogen fluoride, separating partially spent liquid hydrogen fluoride and a hydrocarbon product containing a small proportion of dissolved hydrogen fluoride from said treating process, vaporizing dissolved hydrogen fluoride from said hydrocarbon product, absorbing the resultant hydrogen fluoride vapor in a hydrocarbon charging stock containing a substance capable of forming a hydrogen fluoride complex with hydrogen fluoride, thereafter separating hydrogen fluoride complex from the hydrocarbon charging stock and passing the hydrocarbon charging stock to the treating process, subjecting separated hydrogen fluoride complex and partially spent liquid hydrogen fluoride derived from said hydrocarbon treating process to a regeneration operation to produce hydrogen fluoride, and recycling hydrogen fluoride thus produced to said hydrocarbon treating process.

3. A process for refining a hydrocarbon charging stock containing sulfur compounds which process comprises contacting said hydrocarbon charging stock in a refining zone with substantially anhydrous liquid hydrogen fluoride in quantity sufficient at least to form a distinct extract phase and a raffinate phase containing dissolved hydrogen fluoride, vaporizing hydrogen fluoride from said raffinate phase, selectively absorbing the resultant hydrogen fluoride vapor in additional hydrocarbon charging stock in an absorption zone, separating an immiscible liquid phase containing hydrogen fluoride and sulfur compounds from said additional hydrocarbon charging stock and thereafter passing said additional hydrocarbon charging stock to said refining zone.

4. A process for refining a hydrocarbon charging stock containing sulfur compounds which process comprises contacting said hydrocarbon charging stock in a refining zone with substantially anhydrous liquid hydrogen fluoride in quantity sufficient at least to form a distinct extract phase and a raffinate phase containing dissolved hydrogen fluoride, vaporizing hydrogen fluoride from said raffinate phase, selectively absorbing the resultant hydrogen fluoride vapor in additional hydrocarbon charging stock in an absorption zone, separating an immiscible liquid phase containing hydrogen fluoride and sulfur compounds from said additional hydrocarbon charging stock, thereafter passing said hydrocarbon charging stock to the refining zone, combining said extract phase and said immiscible liquid phase and subjecting the resultant mixture to a regeneration operation to produce hydrogen fluoride and passing hydrogen fluoride produced in said regeneration operation to said refining zone.

5. The process of claim 2 wherein the hydrocarbon treating process is a hydrocarbon cracking process.

6. The process of claim 2 wherein the hydrocarbon treating process is a process for the alkylation of paraffins with olefins.

7. A hydrocarbon treating process which comprises, in sequence contacting hydrocarbons under treating conditions with liquid hydrogen fluoride, separating partially spent liquid hydrogen fluoride and a hydrocarbon product containing a small proportion of dissolved hydrogen fluoride from said treating process, vaporizing dissolved hydrogen fluoride from said hydrocarbon product, absorbing the resultant hydrogen fluoride vapor in a hydrocarbon charging stock containing a hydrogen fluoride-soluble aromatic hydrocarbon, and thereafter separating a hydrogen fluoride-aromatic hydrocarbon complex from the hydrocarbon charging stock and passing the hydrocarbon charging stock to the treating process.

8. A hydrocarbon treating process which comprises, in sequence contacting hydrocarbons under treating conditions with liquid hydrogen fluoride, separating partially spent liquid hydrogen fluoride and a hydrocarbon product containing a small proportion of dissolved hydrogen fluoride from said treating process, vaporizing dissolved hydrogen fluoride from said hydrocarbon product, absorbing the resultant hydrogen fluoride vapor in a hydrocarbon charging stock containing a hydrogen fluoride-soluble polycyclic aromatic hydrocarbon, and thereafter separating a hydrogen fluoride-polycyclic aromatic hydrocarbon complex from the hydrocarbon charging stock and passing the hydrocarbon charging stock to the treating process.

BERNARD L. EVERING.
ARTHUR P. LIEN.

REFERENCES CITED

The following references are of record in the file of this patent:

UNITED STATES PATENTS

| Number | Name | Date |
| --- | --- | --- |
| 2,267,730 | Grosse et al. | Dec. 30, 1941 |
| 2,305,248 | Fleer et al. | Dec. 15, 1942 |
| 2,339,786 | Larsen et al. | Jan. 25, 1944 |
| 2,343,841 | Burk | Mar. 7, 1944 |
| 2,366,743 | Matuszak | Jan. 9, 1945 |
| 2,375,675 | Matuszak | May 8, 1945 |
| 2,376,328 | Cole | May 22, 1945 |
| 2,378,762 | Frey | June 19, 1945 |

FOREIGN PATENTS

| Number | Country | Date |
| --- | --- | --- |
| 292,932 | Great Britain | May 23, 1929 |